Sept. 6, 1966 P. L. KUZMICK 3,271,036
PHONOGRAPH STYLUS AND METHOD OF MAKING SAME
Filed May 6, 1963 2 Sheets-Sheet 1
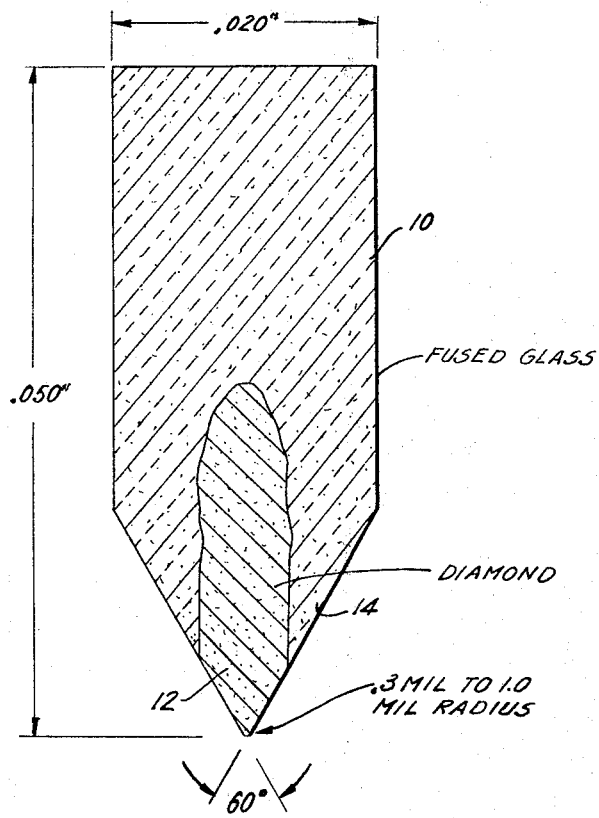
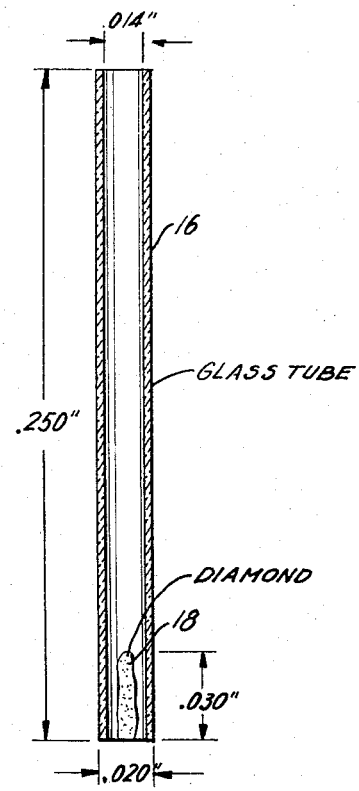
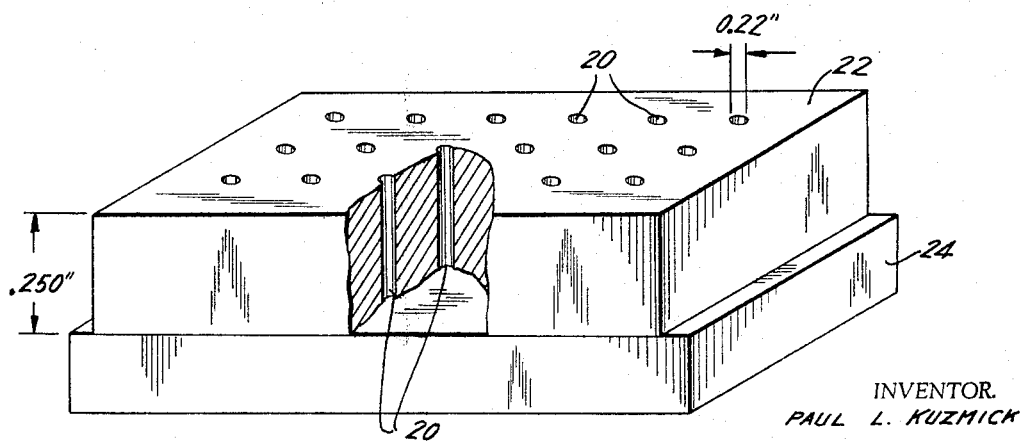
INVENTOR.
PAUL L. KUZMICK
ATTORNEYS

United States Patent Office 3,271,036
Patented Sept. 6, 1966

3,271,036
PHONOGRAPH STYLUS AND METHOD OF MAKING SAME
Paul L. Kuzmick, 30 Oval Road, Essex Fells, N.J.
Filed May 6, 1963, Ser. No. 278,364
2 Claims. (Cl. 274—38)

This invention relates to a phonograph stylus and more particularly to a diamond point phonograph stylus, and to the method of making the same.

Phonograph styli having diamond points or tips are used extensively in phonograph pick-up mechanisms because of their superior performance. Among the several methods that have been employed in manufacturing diamond point phonograph styli, the most common method now followed comprises drilling out a recess at an end of a rod of metal to form a pocket, which metal rod forms the shank of the stylus, putting a comminuted solder into the pocket, into which is then placed the diamond particle or chip; this assembly supported in a holder is heated in vacuum to a high temperature such as 950° C. to solder or braze and bond the end of the metal rod to the diamond chip, after which the said metal-diamond end is ground and polished to finished stylus point shape.

This method is not without its difficulties and drawbacks. It requires considerable handling of the metal shanks, the bonding solder and the minute diamond particles, all of which adds to a higher cost than can be tolerated in a competitive market. This method is particularly disadvantaged by the high reject rate in manufacture which is due to the difficulty in bonding of the diamond particle to the metal shank. This difficulty is such that manufacturers actually grind the diamond particles to an elongated cylinder shape to give a better bonding and holding surface to the diamond, his being, however, an expensive procedural step as all the small diamond particles must be ground with a diamond wheel. Generally, after all these steps of manufacture are gone through, at the final finishing, grinding and polishing steps many of the diamonds become loosened in their shanks.

The prime object of my present invention centers about the provision of a method of making diamond point phonograph styli which can be practiced on a more economical basis than prior art method and which produces such styli of superior quality and performance.

I have found that glass may be directly fused onto a diamond particle or chip to bond the diamond chip thereto; and that a phonograph stylus may be made utilizing the glass as the stylus shank and utilizing the end thereof which is fused about and onto the diamond particle as a firm and strong bond and seat for the finished diamond point. The method employed for making such a stylus is found to be simpler and more economical than the prior art method described. Ancillary objects of my invention center about the manufacture of such diamond point styli.

To the accomplishment of the foregoing objects and such other objects as may hereinafter appear, my invention relates to the phonograph stylus and to the method of making the same defined in the appended claims taken together with the following specification and the accompanying drawings, in which:

FIG. 1 is a view taken in cross-section of the finished diamond point phonograph stylus of the present invention shown on a magnified scale;

FIG. 2 is an elevational view taken in cross-section showing the two starting materials, namely the glass and the diamond employed in the making of the stylus;

FIG. 3 is a perspective view of a mold employed in the process of making a number of styli of the present invention;

Figure 4:
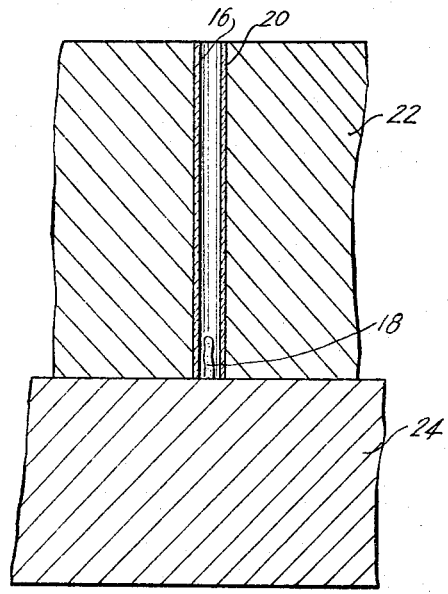
FIG. 4 is an elevational view taken in cross-section and shown on a magnified scale of a section of the mold and the parts assembled thereto in the first steps of the method.

Referring now more in detail to the drawings and having reference first to FIG. 1 thereof, which shows the finished product of the invention, the diamond point phonograph stylus comprises a glass shank 10 and a diamond point 12 set at the end 14 of the glass shank 10, the said end 14 of the glass shank being fused onto the diamond point 12, thereby directly bonding the diamond point to the stylus shank. By fusing the glass shank and particularly the end 14 of the glass shank onto the diamond particle or point 12, there is produced a firm and strong bond and seat for the finished diamond point in the glass shank.

A simple and easily practiced method of assembling the glass shank and the diamond point and of effecting the desired fusion of the glass shank end to the diamond point comprises the steps depicted in FIGS. 2 to 6 of the drawings. Referring to FIG. 2 of the drawings, the starting materials preferably comprise a glass tube 16 and a diamond chip or particle 18. These starting materials are assembled by placing the diamond particle 18 at one end of the glass tube 16, as shown in FIG. 2 of the drawings, then heating this assembly in a mold to be described presently to a temperature to fuse the glass tube 16, the diamond containing end of the glass tube being thereby fused onto the diamond chip or particle, whereby the glass tube, fused, forms a stylus shank and whereby the diamond particle or chip is bonded to the diamond containing end of the shank. After these steps the diamond-glass end of the stylus is finished to diamond point form.

Reverting to the starting materials shown in FIG. 2 of the drawings, the glass tube 16 is drawn preferably to .020" in diameter with a bore of .014" in diameter, with allowable tolerances of the order of plus or minus .0005". The glass tube is cut off to a length of approximately .250". The diamond particle or chip is a relatively elongated piece having a general longitudinal dimension of .030"; and the lateral dimension thereof may be as small as .010 to .012". These dimensions are generally depicted in FIG. 2 of the drawings.

A plurality of assemblies of the starting materials 16 and 18 are set in cavities 20, 20 in a mold 22, the dimensions of the cavities being exactly suited to the dimensions of the glass tubes 16. As will be noted from FIG. 3 of the drawings, the diameter of each mold cavity is .022" and the height of the mold 22 is .250". The mold 22 may be of any desired material such as a dense graphite or stainless steel and many thousands of cavities can be worked into the mold so that a great number of these small glass tubes are processed at one time. The mold member 22 is mounted on a block 24. After the tubes 16 are placed in the mold cavities 20, 20, diamond particles 18, 18 are dropped into the tubes, these diamond particles fitting easily but not too loosely in the bores of the tubes. The diamond particles drop through the tubes onto the block 24 and therefore to the bottom of the mold 22 which actually positions the diamond particles in the bottom ends of the glass tubes. This is depicted in FIG. 4 of the drawings.

Figure 6:
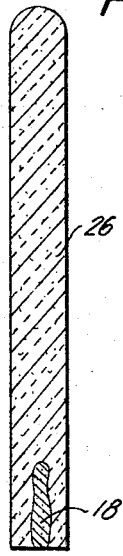
FIG. 6 is a view of the product as yielded from the method step depicted in FIG. 5, which latter is then subjected to the finishing operations to produce the ultimate product shown in FIG. 1 of the drawings.
Figure 5:
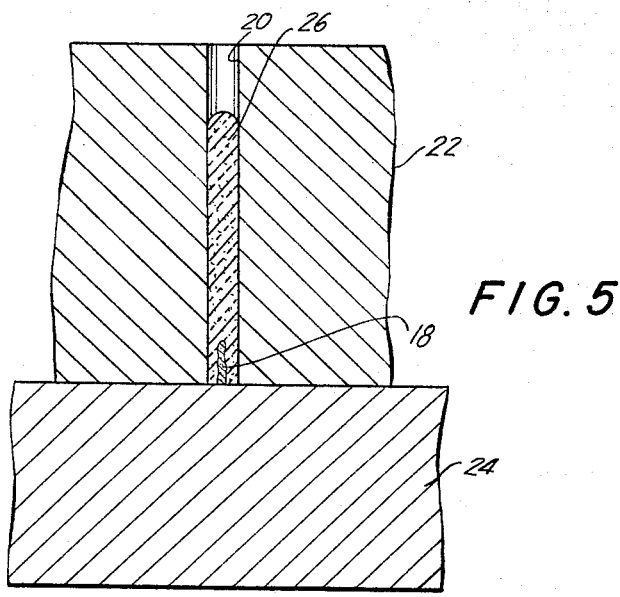
FIG. 5 is a view similar to FIG. 4 explanatory of a subsequent step of the method.

After the mold 22 is fully assembled, the assembled mold is placed in a furnace and heated so that the glass attains a temperature of approximately 705° C. for a time long enough to soften the glass, causing it to fuse and mold itself around the diamond chip or particle, at the same time completely closing up the bore or hole in the tube, with the result that the tube now is transformed into a glass rod 26, the bottom end of which now is molded about and onto the diamond chip or particle 18 fully enclosing and seating the same, as is well depicted in FIG. 5 of the drawings. The mold is then cooled and the glass shanks with the diamonds embedded therein are removed and are ready for the finishing operation. When removed from the mold each resulting product comprises, as is shown in FIG. 6 of the drawings, a glass rod shank 26, the bottom end of which is fused onto and bonds the diamond chip or particle 18.

I have found that the diamond particles or chips are so held by the fused glass ends that it is impossible to dislodge the diamond chips without breaking their setting, thus making a breakproof fused-in glass unit, to be contrasted with diamond pointed styli set in steel or other metal shanks. Also it will be apparent that the described steps of assembling the starting materials, namely the glass tubes 16 and the diamond particles 18 in the mold, and the treatment given to the mold ending in the removal of the diamond containing shanks from the mold, are steps to be contrasted with the difficult and complicated method steps of setting diamond particles in metal shanks.

I have found that among the various glasses that may be used in the practice of the invention that particularly good results are achieved with the use of a boro-silicate glass.

In the molding steps, not only is the diamond particle or chip securely fused in the glass, but the shank portion of the stylus is simultaneously formed to the diameter required in the industry; and the shank portion requires no further finishing other than cutting off the shank to its proper or desired length, namely to a length of .050", as indicated in FIG. 1 of the drawings, (with a tolerance of plus or minus .005"). The resulting product is now subjected to the finishing steps of grinding and polishing the diamond point end of the stylus. The grinding and polishing of the diamond point or tip is a relatively simple operation as the type of setting produced permits the use of small diamond particles which makes the grinding very simple and easy as the amount of diamond to be removed is small. After the major grinding step to produce the conical 60° formation depicted in FIG. 1, the diamond-glass shank end is ground and polished to gem-like appearance and then the proper radius indicated in FIG. 1 of the drawings is put on the tip of the diamond.

The diamond point phonograph stylus of the present invention and the method of making the same and the various advantages thereof will be fully apparent from the above detailed description thereof. In addition to the improved structural and method characteristics described, it has been found that the improved stylus of the invention produces excellent reproduction results in phonograph operation. It will be further apparent that many changes may be made in the stylus structure and in the steps of the method without departing from the spirit of the invention defined in the following claims.

I claim:
1. A diamond point phoograph stylus comprising a glass shank and a diamond point set at the end of the glass shank, the said end of the glass shank being fused onto the diamond point thereby bonding the diamond point to the stylus shank.

2. A diamond point phonograph stylus comprising a boro-silicate glass shank and a diamond point set at the end of the glass shank, the said diamond point being bonded to and held by said glass shank by said glass shank end being fused onto the diamond point.

References Cited by the Examiner
UNITED STATES PATENTS

| | | | |
|---|---|---|---|
| 1,260,365 | 3/1918 | Gibson | 274—38 |
| 2,660,438 | 11/1953 | Holtz | 274—38 |
| 2,992,007 | 7/1961 | Bondley | 274—38 |
| 3,064,391 | 11/1962 | Devol | 65—45 |
| 3,106,463 | 10/1963 | Norton | 65—45 |

FOREIGN PATENTS 683,271    2/1930    France.

NORTON ANSHER, *Primary Examiner.*
CLIFFORD B. PRICE, *Assistant Examiner.*